No. 738,167. PATENTED SEPT. 8, 1903.
G. H. DAY.
AUTOMOBILE CONTROLLING MECHANISM.
APPLICATION FILED JAN. 16, 1903.
NO MODEL.

Witnesses.
Rudolph Riege
M. L. Clark

Inventor.
George H. Day,
by Hermann ——
attorney.

No. 738,167. Patented September 8, 1903.

UNITED STATES PATENT OFFICE.

GEORGE H. DAY, OF HARTFORD, CONNECTICUT, ASSIGNOR TO ELECTRIC VEHICLE COMPANY, OF JERSEY CITY, NEW JERSEY, A CORPORATION OF NEW JERSEY.

AUTOMOBILE-CONTROLLING MECHANISM.

SPECIFICATION forming part of Letters Patent No. 738,167, dated September 8, 1903.

Application filed January 16, 1903. Serial No. 139,321. (No model.)

*To all whom it may concern:*

Be it known that I, GEORGE H. DAY, a citizen of the United States, and a resident of Hartford, in the State of Connecticut, have invented certain new and useful Improvements in Automobile-Controlling Mechanism, of which the following is a specification.

This invention relates to means for braking and control of automobiles, and more particularly to means for preventing injury to parts of the propelling mechanism or source of power by improper or accidental manipulation of the controlling means.

The direct object of my invention in an electric automobile is to prevent the application of the power when the brake or brakes are locked on. In this use of my invention the object is, furthermore, to permit a free use of the brake at all times. In all, my object is to avoid in such a mechanism various objectionable features in brake and controlling mechanism which have heretofore been suggested, such as the immediate cutting out of the operating-circuit the moment the operator applies the brake or starts to apply it. In such a case as the latter during the maneuvering of a vehicle in a crowded street it will be readily seen that the cutting out of the circuit whenever the brake was applied would be totally impracticable, the impracticability of which would be enhanced by what has heretofore been further suggested—namely, the closing of the circuit after automatic cut-out only upon the return of the controller of the vehicle to its off position. This latter acquirement has been a necessity for such an automatic brake cut-out. All these impracticable features it is the object of my invention to avoid.

I have illustrated a preferred form of my invention as embodied in an automobile in the accompanying drawings, in which—

Figure 1:
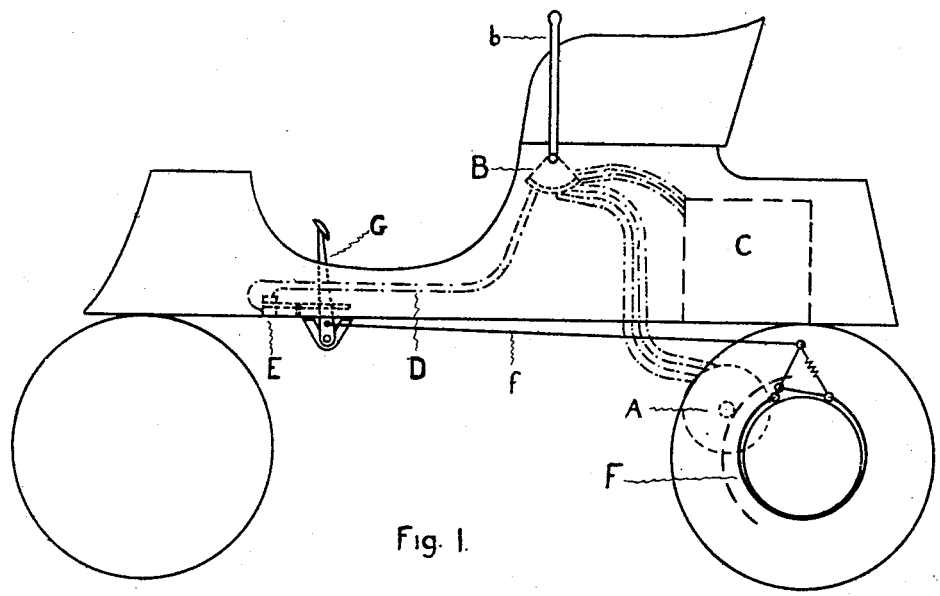
Figures 2, 3:
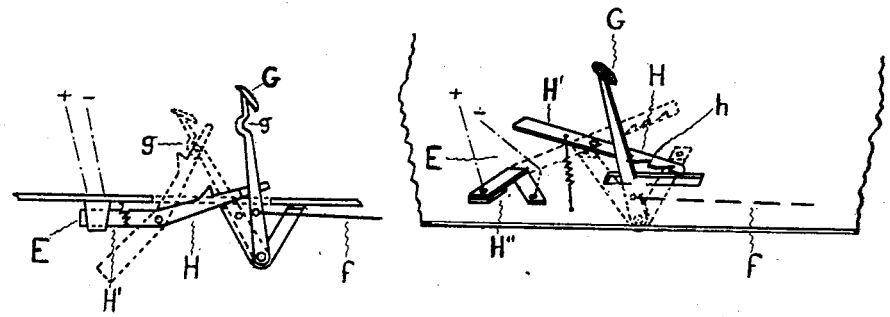

Figure 1 is a side view of an automobile, showing the general arrangement of elements. Fig. 2 is a side elevation, on a larger scale, of brake-operating means and associated parts. Fig. 3 is a perspective view of brake-operating means, showing more fully the arrangement of all associated details with some modified.

The drawings show an electric automobile, in which A is the motor.

B is a controller of any desired construction by which the application of current from the battery C is varied in amount or cut off entirely at the will of the operator by manipulation of the handle *b*. In the main current-carrying power-circuit, such as D, through which the current to the motor is controlled by the controller B, is placed a switch E for cutting the main circuit, and thereby making the operation of the controller ineffective and preventing when open the transmission of any electrical energy to the motor.

The brake F on rear wheels is operated, through the rod *f*, by a foot press or lever G, pivoted to the body. As shown more particularly in Figs. 2 and 3, this brake-lever G is freely moving; but associated therewith is a locking device H. This locking device remains in an off position, permitting free movement of the brake-lever G unless it is voluntarily actuated. When so voluntarily actuated, it engages the lever G, as by notches *g*, Fig. 2, while in the modified details in Fig. 3 the brake-lever engages any of the several teeth *h*. The locking device H has integral with it switch member H', as in Fig. 2 or as in Fig. 3, coöperating with the mechanism H'' to actuate the main cut-out switch E. Upon movement of the locking device H the switch E is actuated—that is, when the latch is moved to lock the brake-lever in a position in which the brake is held applied, and therefore preventing the vehicle from moving, the switch is simultaneously opened, so as to cut the main circuit and prevent power being applied to the motor.

It will be seen that the above-described parts coöperate in the following manner: The operator of the vehicle may freely apply the brake to any desired degree, while upon release of the brake-lever the brake will be released, permitting free movement of the vehicle. If, however, the operator wishes to leave the vehicle on an incline, he may lock the brake-lever, and thereby the brake, in an applied position by throwing in the latch to engage the lever; but when so voluntarily throwing in this independently-operated locking device he simultaneously opens the switch in the power-circuit. It will be seen that when again entering the vehicle, although he may operate the controller-handle B, the main switch E being open, no current will be cut onto the motor by the controller B until the operator has performed a distinct voluntary action in releasing the brake. The effect of the use of my invention will thus be seen to prevent the starting of a vehicle when the brake or brakes are applied and conjointly preventing any automatic locking of the brake without cutting out the motor or preventing the application of power when such brake is held in an applied position. It nevertheless permits the voluntary application of the brake at all times when running without any automatic cutting out of the current, which would suddenly incapacitate the vehicle, while, on the other hand, it also permits the operator to voluntarily hold the brake in an "on" position when starting to apply the power, a condition which occasionally becomes necessary, such as when starting a vehicle from a standstill up a steep incline. In all, my invention meets the requirements of everyday practice without permitting the operator to improperly actuate the controlling mechanism to the injury of the vehicle, while heretofore the mechanism has been such that operators of vehicles frequently apply the power when the brake is set, thereby overtaxing or permanently injuring the driving mechanism of the vehicle—as, for instance, unduly exhausting the batteries of an electric vehicle, burning out the motors, or injuring the controller.

It will be seen that various modifications can be made in the embodiment of my invention, as well as numerous changes in the construction of the devices necessary to effect the results, while still embodying the invention I desire to secure by Letters Patent.

What I claim is—

1. In an electric vehicle, a motor, a source of power, a current-controller, a separate cut-out switch, means for braking said vehicle, and means for voluntarily locking said brake in applied position, said locking means coöperating with said cut-out switch whereby the locking of the brake in an applied position coöperates to prevent the application of power to the motor.

2. In a motor-vehicle, a motor, a source of power, a controller to regulate the application of the power, a switch for cutting off the power, a brake, a brake-operating member, and a device for locking said brake-operating member, said locking device coöperating with the cut-out whereby the locking of the brake in an applied position is accompanied by a cutting out of the power.

This specification signed and witnessed this 12th day of January, A. D. 1903.

GEORGE H. DAY.

In presence of—
M. J. BUDLONG,
A. E. WHITE.